(12) United States Patent
Neumann et al.

(10) Patent No.: US 7,322,755 B2
(45) Date of Patent: Jan. 29, 2008

(54) CAMERA ARRANGEMENT FOR A MOTOR VEHICLE

(75) Inventors: Carsten Neumann, Dortmund (DE); Gregor Boehne, Castrop-Rauxel (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 11/542,727

(22) Filed: Oct. 4, 2006

(65) Prior Publication Data

US 2007/0041725 A1 Feb. 22, 2007

Related U.S. Application Data

(63) Continuation of application No. PCT/EP2005/005307, filed on May 14, 2005.

(30) Foreign Application Priority Data

May 19, 2004 (DE) .................. 10 2004 024 735

(51) Int. Cl.
*G03B 29/00* (2006.01)
*H04N 7/18* (2006.01)

(52) U.S. Cl. ........................ 396/427; 348/148

(58) Field of Classification Search ............... 396/427, 396/429; 352/131, 132; 348/148, 149
See application file for complete search history.

(56) References Cited

U.S. PATENT DOCUMENTS

| 6,104,149 A | 8/2000 | Pelly |
| 6,170,955 B1 | 1/2001 | Campbell et al. |
| 6,799,904 B2 | 10/2004 | Schaefer et al. |
| 2004/0032668 A1* | 2/2004 | Schaefer et al. ............ 359/642 |

FOREIGN PATENT DOCUMENTS

| DE | 196 47 200 C1 | 1/1998 |
| DE | 102 37 554 A1 | 3/2004 |
| DE | 102 37 607 A1 | 3/2004 |
| EP | 1 389 565 A1 | 2/2004 |

* cited by examiner

*Primary Examiner*—W. B. Perkey
(74) *Attorney, Agent, or Firm*—Brooks Kushman P.C.

(57) ABSTRACT

A camera arrangement for a motor vehicle includes a camera aimed onto a glass pane of a vehicle. The camera arrangement further includes a light-transmitting body having a solid and optically transparent material. The light-transmitting body is arranged between the camera and the glass pane and connects the camera to the glass pane. The light-guiding body may be an optically transparent, hardenable casting compound made of glass or a gel.

25 Claims, 3 Drawing Sheets

CAMERA ARRANGEMENT FOR A MOTOR VEHICLE

CROSS-REFERENCE TO RELATED APPLICATIONS

This is a continuation of International Application PCT/EP2005/005307, published in German, with an international filing date of May 14, 2005, which claims priority to DE 10 2004 024 735.8, filed May 19, 2004, the disclosures of which are both hereby incorporated by reference.

BACKGROUND OF THE INVENTION

1. Field of the Invention

The present invention relates to a camera arrangement having a camera connected to and aimed at a glass pane of a motor vehicle.

2. Background Art

DE 102 09 615 A1 (corresponding to U.S. Pat. No. 7,104,149) describes a camera arrangement having a camera connected to and aimed at a glass pane (e.g., a windshield) of a motor vehicle. A tube-like coupling element ("tube") connects the camera to the glass pane. The space spanned by the tube between the camera and the glass pane is tightly sealed off from the external environment and hence has its own atmosphere, or is filled with a liquid "condensed medium", to prevent the camera's field of view from being covered with dust or condensation.

This camera arrangement has disadvantages. First, sealing requires a relatively great deal of effort to maintain the impermeability of the tube over a desired service life. Second, the camera arrangement is not a self-contained module as the tube is filled or evacuated after the camera arrangement is installed on the glass pane. Third, as a result of the second disadvantage, installation and removal of the camera arrangement to and from the glass pane is relatively elaborate and laborious. Fourth, the space taken up by the camera arrangement is relatively large. This space is especially large if the glass pane has a high slope as the required enlargement of the volume of the tube further increases the sealing effort. Fifth, the relatively large space taken up by the camera arrangement causes relatively high reflection losses depending on the camera's viewing angle and the slope of the glass pane.

DE 102 37 554 A1 and DE 102 37 607 A1 describe similar camera arrangements without complete hermetic sealing of the tube. DE 102 37 608 A1 (corresponding to U.S. Pat. No. 6,799,904) describes features for eliminating the resulting condensation problems which occur with these camera arrangements. The features include an additional isolating air layer between the tube and the glass pane in the area of the camera's field of view. The air layer counteracts condensation in the camera's field of view. The camera arrangement described in DE 102 37 608 A1 is also without hermetic tube sealing. As such, assuming condensation and soiling can be avoided, this camera arrangement does not have the noted impermeability disadvantages. However, this camera arrangement still has the following disadvantages: a relatively large space requirement—especially with a high sloped glass pane; and relatively large reflection losses—depending on the viewing angle and the slope of the glass pane.

SUMMARY OF THE INVENTION

An object of the present invention is a camera mounted to an inner surface of a glass pane of a motor vehicle without the disadvantages noted above.

Another object of the present invention is a camera mounted to an inner surface of a windshield of a motor vehicle in the area of the interior rearview mirror of the vehicle without the disadvantages noted above.

In carrying out the above objects and other objects, the present invention provides a camera arrangement for a motor vehicle. The camera arrangement includes a camera and a light-transmitting body. The camera is aimed onto a glass pane of a motor vehicle. The light-transmitting body has a solid and optically transparent material. The light-transmitting body is arranged between the camera and the glass pane and connects the camera to the glass pane.

The light-transmitting body may be a single unit of a single solid and optically transparent material. The light-transmitting body may include at least two portions each having a different solid and optically transparent material with different optical properties. In this case, the at least two portions of the light-transmitting body may be connected with one another such that the light-transmitting body is a single unit. The camera arrangement may further include a coupling element having a hollow body. In this case, the coupling element encloses the light-transmitting body such that the light-transmitting body is contained within the hollow body of the coupling element.

A first side of the light-transmitting body may be attached to the camera and a second side of the light-transmitting body opposite to the first side of the light-transmitting body may be attached to the glass pane. In this case, the first side of the light-transmitting body may have a recessed camera space to receive a part of the camera and the camera may be detachably attached to the first side of the light-transmitting body. The light-transmitting body may encapsulate the camera such that a portion of the light-transmitting body is arranged between the camera and the glass pane.

In carrying out the above objects and other objects, the present invention provides a camera arrangement for a motor vehicle. This camera arrangement includes a camera and a coupling element. The camera is aimed onto a glass pane of a vehicle. The coupling element has a hollow body filled with at least one optically transparent, hardened casting mass. The coupling element is connected to the camera and the glass pane with the casting mass being arranged between the camera and the glass pane.

The casting mass may include a soft elastomer. This camera arrangement may further include a detachable mechanical connector which connects the coupling element to the glass pane. The casting mass may include areas having optical effects that form image correction elements. The coupling element may have roughed walls which form the hollow body of the coupling element. The coupling element may have opaque walls which form the hollow body of the coupling element. The coupling element may have a recessed portion on one side which forms a camera space. In this case, a portion of the camera fits within the recessed portion of the coupling element. Further in this case, the camera may be detachably attached to the coupling element.

In carrying out the above objects and other objects, the present invention provides a camera arrangement for a motor vehicle. This camera arrangement includes a camera, a light-transmitting body, and a coupling element. The camera is aimed onto a glass pane of a vehicle. The light-transmitting body has a solid and optically transparent material. The coupling element has a hollow body. The light-transmitting body is arranged within the hollow body of the coupling element. The coupling element is connected to the camera and is connected to the glass pane such that the light-transmitting body is arranged between the camera and the glass pane and the camera is connected to the glass pane. The light-transmitting body may include at least one of a glass and a gel. The light-transmitting body may include at least two portions each having a different solid and optically transparent material with different optical properties.

Herein, "camera" refers to any type of spatially resolving optical sensor such as a CCD or CMOS sensor containing optical sensing elements. Herein, "solid" refers to any material that can fill the space between a glass pane and the camera without the use of a sealing wrapper. Such materials include crystalline solids, amorphous solids, glass, and gels. Herein, "optically transparent" refers to any material having a sufficiently high light-transmission efficiency over the wavelength sensitivity spectrum of the camera.

A camera arrangement (i.e., camera system) in accordance with the present invention includes a light-transmitting body made of a solid and optically transparent material arranged between the camera lens of the camera and the glass pane. The camera arrangement makes it simple and economical to make the area located between the glass pane and the camera resistant to the climatic conditions and soiling and keeps the camera's field-of-view free from interference.

The camera arrangement in accordance with the present invention has the following advantages: no problems caused by soiling or dew; an elaborate seal is not required; refractive properties of the light-transmitting body enable the size of the camera arrangement to be reduced; and light losses/reflections (Fresnel losses) which occur when the light crosses the glass pane are reduced.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 8:
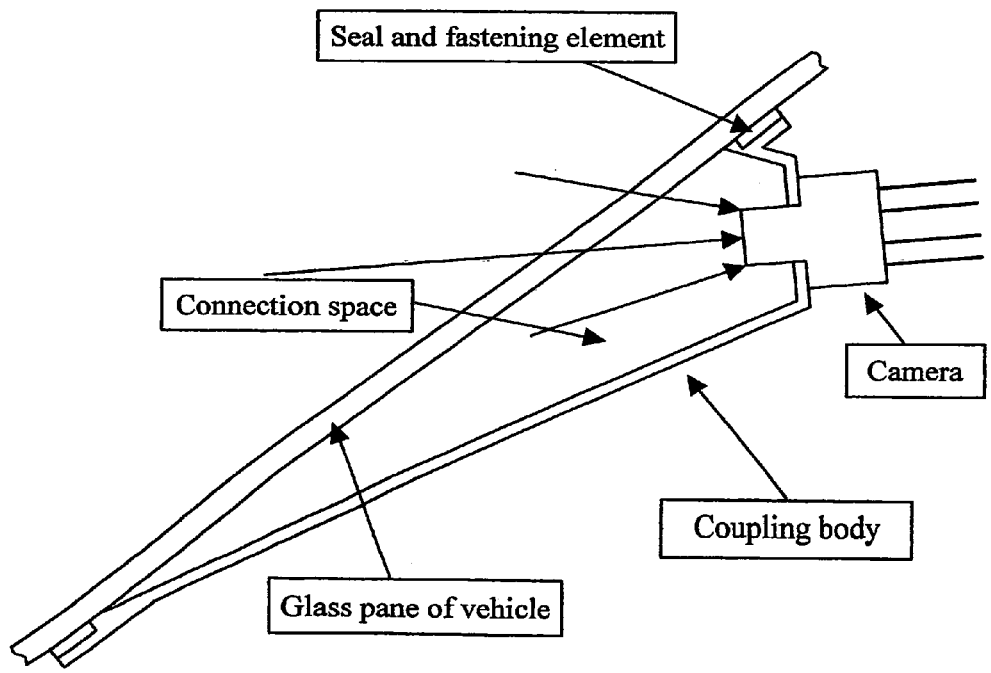
FIG. 8 illustrates a camera arrangement in accordance with the background art.

Referring now to FIG. 8, a camera arrangement such as described in DE 102 09 615 A1 is shown. This camera arrangement includes a camera connected to and aimed at an inner surface of a glass pane of a motor vehicle. The camera takes pictures of the outside through the glass pane. A coupling body connects the camera to the glass pane. The coupling body has a hollow body with one opaque middle wall and two opaque side walls. The middle wall is opposite to the glass pane and ends of the two side walls meet the glass pane. Seal and fastening elements connect the ends of the side walls meeting the glass pane to the glass pane in order to connect the coupling body to the glass pane. The hollow body bounded by the coupling body walls and the glass pane is a connection space. The camera is connected to the middle wall with the lens assembly of the camera being inserted through the middle wall into the connection space. In operation, the coupling body keeps dirt and stray light away from the camera.

The camera generally has a horizontal viewing section. The glass pane is the windshield of a passenger vehicle and has a relatively large slope. As such, the coupling body substantially limits the region that the camera photographs unless the coupling body has, as shown in FIG. 8, a relatively large outer surface at least in its lower region and a relatively large interior volume. However, a coupling body having a relatively large outer surface and a relatively large interior volume is undesirable for practical reasons as noted above in the Background Art section.

Another problem with this camera arrangement is that the connection space spanned by the coupling body has its own atmosphere (i.e., is sealed off from the external environment) in order to protect the field-of-view of the camera from condensation. This places difficult requirements on the coupling body with regard to its impermeability and its service life and also makes installation of this camera arrangement laborious. These difficulties and other difficulties associated with the coupling body of this camera arrangement are noted above in the Background Art section.

A camera arrangement in accordance with the present invention solves the disadvantages associated with the camera arrangement illustrated in FIG. 8 by having a light-transmitting body (i.e., a light-guiding body) comprising a solid and optically transparent material arranged in the space between the camera and the glass pane and which connects the camera to the glass pane.

Figure 1:
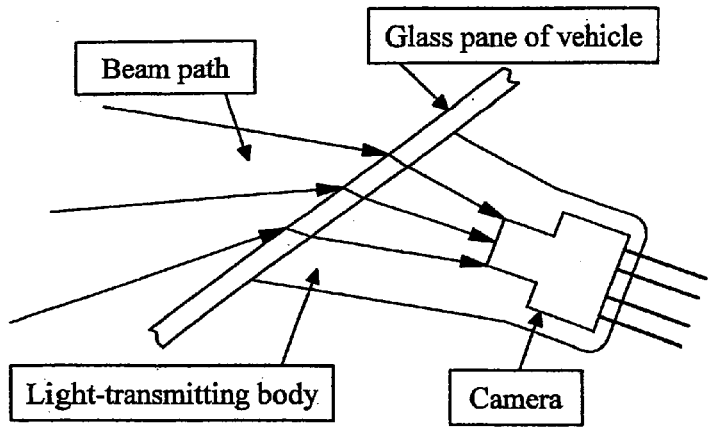
FIG. 1 illustrates a camera arrangement in accordance with a first embodiment of the present invention.

Referring now to FIG. 1, a camera arrangement in accordance with a first embodiment of the present invention is illustrated. An optically transparent block (i.e., a light-transmitting body) completely encapsulates a camera. The casting of the light-transmitting body with the encapsulated camera meets the glass pane on one side such that the casting is flush with the glass pane. The walls of the light-transmitting body are roughened and opaque in order to avoid interfering reflections and penetrating extraneous light.

A camera arrangement in accordance with the present invention has the following advantages: no problems with sealing; the refractive properties of the light-transmitting body enable the camera arrangement to be smaller, especially when the glass pane has a large slope; less light loss due to reflection off the inner surface of the glass pane, and off the camera if the light-transmitting body and the camera come into direct contact; and suitability for different climates as there are no condensation surfaces in the optical path between the glass pane and the camera.

A camera arrangement in accordance with the present invention is optimized for: simple installation/removal/replacement of its individual parts; taking into consideration tolerances in the glass pane; making its individual parts and the entire camera arrangement easy to produce; and good picture quality.

The prismatic effect of the light-transmitting body inherently may cause chromatic aberrations (color errors) and geometric aberrations (distortions) resulting in a loss of resolution. Correction of such aberrations can be taken into consideration in the optical design of the light-transmitting body. Optical solutions which can be used to avoid chromatic aberrations is to restrict the range of usable wavelengths by filtering the incident light and/or compensating the dispersion over a sufficient range of wavelengths. Both solutions reduce chromatic aberrations, ideally below the camera's detection threshold. Dispersion compensation provides an additional advantage of maintaining the speed of the optics. This can be realized by using a combination of two suitable materials with different refractive indices, according to the flint glass/crown glass principle. Both substances can be processed economically in series production, by casting or injection molding.

A goal of the construction stages discussed below is the most favorable combination of the above-mentioned advantages with aspects such as ease of manufacture and low costs while maintaining high image quality.

Advantages of a camera fastening system based on a light-transmitting body in accordance with the present invention include: small size, even with strongly sloped glass panes; good optical properties (correction of aberrations); minimum number of different parts (cost advantage); individual parts that lend themselves to simple and economical manufacture; and simple assembly/dismantling, both of the individual parts and of the entire camera system in the vehicle (cost advantage, acceptance by motor vehicle manufacturers).

In accordance with the present invention, a light-transmitting body made of glass and/or plastic replaces the hollow coupling body of the camera arrangement shown in FIG. 8. The light-transmitting body has a relatively small volume as compared with the volume of the hollow coupling body. The volume of the light-transmitting body is just sufficient for the camera.

In embodiments of the present invention shown in FIGS. 2 through 7, the camera is not encapsulated within the light-transmitting body. Rather, the middle wall of the light-transmitting body has a recessed portion (i.e., a camera space) in which a part of the camera (e.g., the camera lens) fits within with the camera being connected to the remaining portions of the middle wall of the light-transmitting body. These embodiments enable the camera to be removably attached to the light-transmitting body such that the camera is replaceable as an individual component. The camera space is dust-proof. The small volume of the camera space enables the camera space not to be evacuated as it is possible to rapidly heat up the camera space to prevent condensation. If a material with low heat conduction is used for the light-transmitting body, then the camera space is well isolated from glass pane. This further reduces the risk of condensation.

The light-transmitting body and the first objective lens of the camera may be combined into a prism/lens unit to eliminate the camera space. In this variant of the present invention, the light-transmitting body and the camera form a complete sensor module.

Figure 2:
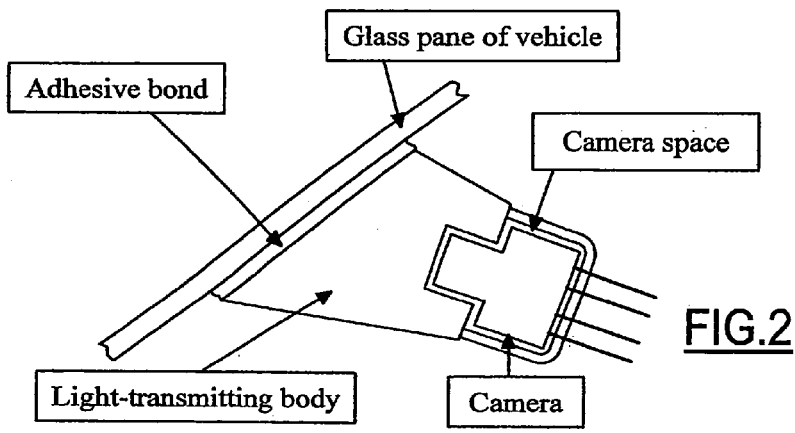
FIG. 2 illustrates a camera arrangement in accordance with a first variant of a second embodiment of the present invention.

Referring now to FIG. 2, a camera arrangement in accordance with a first variant of a second embodiment of the present invention is shown. In this camera arrangement, an adhesive bond connects a surface of the light-transmitting body opposite to the camera to the glass pane. The adhesive assumes the function of evening out tolerances inherent in the glass pane and thus create the optical closure with the light-transmitting body.

Figure 3:
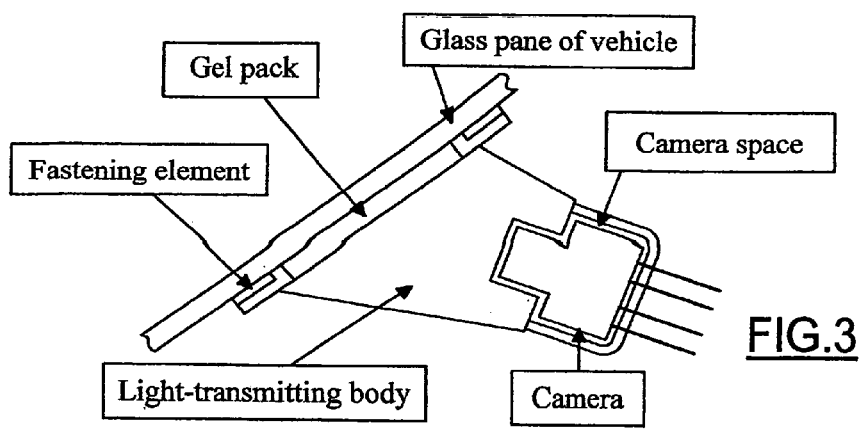
FIG. 3 illustrates a camera arrangement in accordance with a second variant of the second embodiment of the present invention.

Referring now to FIG. 3, a camera arrangement in accordance with a second variant of the second embodiment of the present invention is shown. In this camera arrangement, fastening elements located outside of the field-of-view of the camera connect the ends of the side walls of the light-transmitting body to the glass pane. Various mounting mechanisms for the fastening elements are conceivable. For instance, a retaining ring bonded to the glass pane and that has a bayonet fitting or the like all the way to pins which have been embedded into the glass pane to fix the light-transmitting body using the principle of a snap fastener. Variants having a "fastening device lying outside the field of view" have an elastic and optically transparent connecting element (e.g., a gel pack) made as an individual part or connected with the light-transmitting body to bridge the tolerances inherent in the glass pane and thus create the optical closure with the light-transmitting body.

Thus, the variants illustrated in FIGS. 2 and 3 allow the camera to be replaced. The "adhesive variant" illustrated in FIG. 2 requires an adhesive with good mechanical and optical properties because the camera is looking through the adhesive bond and the adhesive is simultaneously intended to hold the system reliably over its service life. The "version with fastening element" variant illustrated in FIG. 3 allows the light-transmitting body to be removed from the glass pane. Therefore, the "version with fastening element" illustrated in FIG. 3 is especially advantageous as it spares the motor vehicle manufacturer the task of making the adhesive bond, and additionally makes the light-transmitting body replaceable.

Figure 4:
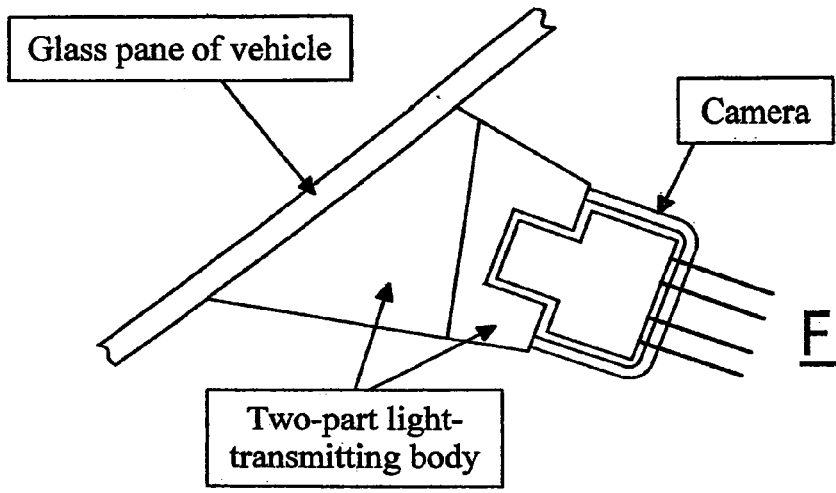
FIG. 4 illustrates a camera arrangement in accordance with a third embodiment of the present invention.

Referring now to FIG. 4, a camera arrangement in accordance with a third embodiment of the present invention is shown. The mentioned advantage of avoiding chromatic aberrations by using an achromatic prism combination leads to a multiple part light-transmitting body as illustrated in FIG. 4. A first part of the light-transmitting body refracts the incident rays and thus allows the light-transmitting body to have a reduced size. A second part of the light-transmitting body compensates the resulting chromatic aberration.

The transitions between the media of the parts of the light-transmitting body having an optical effect are freely fashioned and thus allow further optimization. The parts include optically transparent, solid material, preferably of glass or plastic. The entire light-transmitting body in turn can be mounted to the glass pane by adhesive bonding or through outside attachment points.

Figure 5:
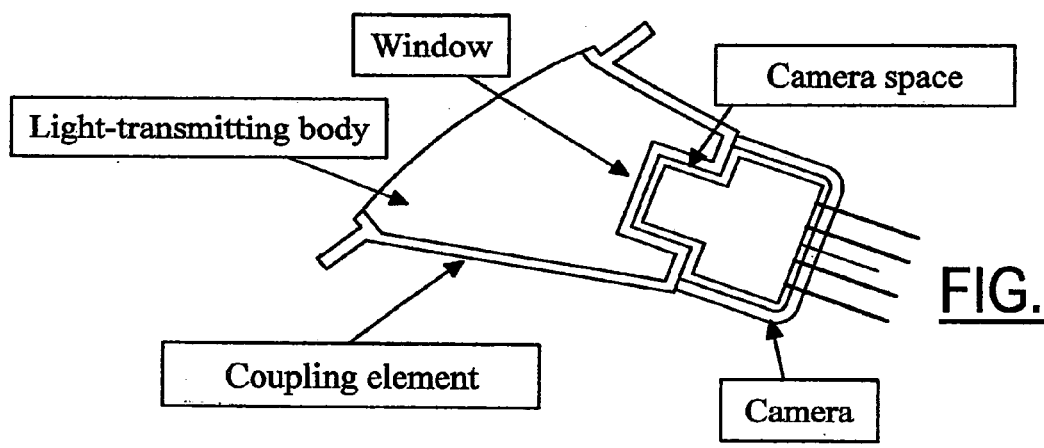
FIG. 5 illustrates a camera arrangement in accordance with a first variant of a fourth embodiment of the present invention.
Figure 6:
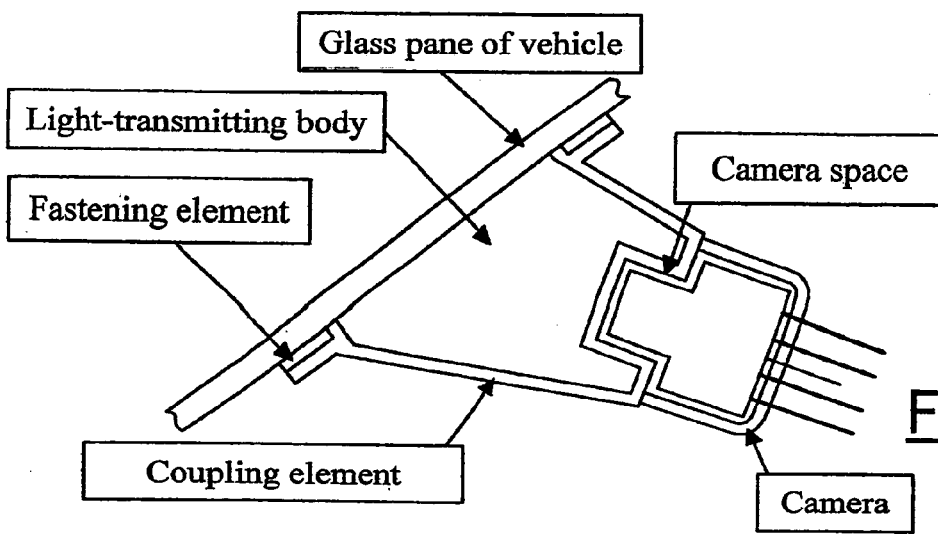
FIG. 6 illustrates a camera arrangement in accordance with a second variant of the fourth embodiment of the present invention.
Figure 7:
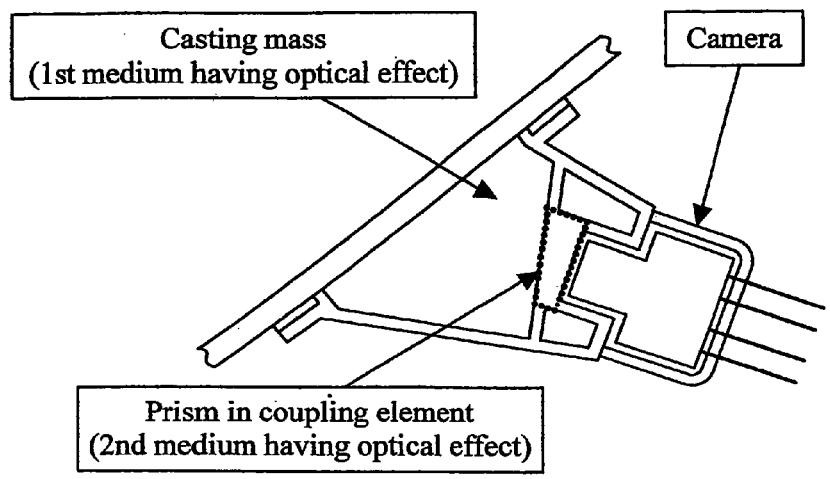
FIG. 7 illustrates a camera arrangement in accordance with a fifth embodiment of the present invention.

With reference to FIGS. 5, 6, and 7, problems relating to material accumulations resulting from injection molding can be avoided by using a light-transmitting body that is not a single piece, but rather has the following structure: a coupling element in the form of a hollow body having side walls and a middle wall connecting the camera with the glass pane and filled with an optically transparent, hardening mass ("casting mass") which has the function of a light-transmitting body.

Referring now to FIGS. 5 and 6, a camera arrangement in accordance with first and second variants of a fourth embodiment of the present invention are respectively shown. FIGS. 5 and 6 illustrate the principle of a filled coupling element structure. In these variants, the coupling element is a mold fixing the casting mass to the desired geometry. In these variants, the coupling element has no optical function except for an optically transparent window along the middle wall for the camera.

The casting mass makes production simpler, especially in mass production, as the individual parts make it possible to avoid accumulations of the mass. The use of a casting mass makes it simple to make an optical connection to the glass pane, especially if the casting mass is elastically hardened, as it will form a convex surface. This is shown in FIGS. 5 and 6. The casting mass preferably forms a jelly-like, cross-linked solid such that it is deformable and is attachable to the glass pane without a transition.

Taking advantage of a casting mass as a refractive material and as a way of evening out the tolerances in the glass pane improves light transmission efficiency and eliminates an elastic connecting element necessary if the light-transmitting body is a single piece. The "casting mass solution" shown in FIGS. 5 and 6 has similar optical properties to the "single piece" light-transmitting body shown in FIGS. 2 and 3. Of course, it is possible to realize a multiple-part light-transmitting body comparable to the embodiment shown in FIG. 4 by using a plurality of different casting masses for the light-transmitting body.

Referring now to FIG. 7, a camera arrangement in accordance with a fifth embodiment of the present invention is shown. A solution to correct the chromatic aberrations is to use the casting mass as a refractive medium and the coupling element which is present anyway as a correction element having an optical effect as shown in FIG. 7.

Here again, the boundaries between the mediums having an optical effect are freely fashioned, unless they are limited by outer shapes (e.g., by that of the glass pane). Optical image formation can be further optimized by other correction elements (such as a prism) projecting into the optical path of the camera from the middle wall of the coupling element.

Advantages of a camera arrangement in accordance with the present invention include the reduced space required by the camera arrangement. The required space is relatively reduced even further if the glass pane has a high slope because of the refractive properties of the light-transmitting body, the reduction of light losses due to reflection, and the elimination of elaborate seals.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A camera arrangement comprising:
a camera aimed towards a pane of a vehicle and being separated from the pane such that a space is between the camera and the pane; and
a light-transmitting body having a solid and optically transparent material filling the space between the camera and the pane, wherein the light transmitting body connects the camera to the pane with one side of the light-transmitting body being connected to the pane and an opposite side of the light-transmitting body being connected to the camera.

2. The arrangement of claim 1 wherein:
the solid and optically transparent material has a refractive index different than the refractive index of air.

3. The arrangement of claim 1 wherein:
the solid and optically transparent material has a refractive index substantially similar to the refractive index of the pane.

4. The arrangement of claim 3 wherein:
the pane is a glass pane and the solid and optically transparent material includes glass.

5. The arrangement of claim 1 wherein:
the solid and optically transparent material includes at least one of glass and plastic.

6. The arrangement of claim 1 wherein:
the solid and optically transparent material is homogenous.

7. The arrangement of claim 1 wherein:
the solid and optically transparent material includes two solid and optically transparent materials having different refractive indexes which function together to form an achromatic prism combination.

8. The arrangement of claim 1 further comprising:
a coupling element having a hollow body, wherein the coupling element encloses the light-transmitting body such that the light-transmitting body is contained within the hollow body of the coupling element.

9. The arrangement of claim 1 wherein:
the opposite side of the light-transmitting body has a recessed camera space to receive a part of the camera and the camera is detachably attached to the opposite side of the light-transmitting body.

10. The arrangement of claim 1 wherein:
the light-transmitting body encapsulates the camera.

11. The arrangement of claim 1 further comprising:
an optically transparent connecting element arranged between the pane and the solid and optically transparent material adjacent to the one side of the light-transmitting body connected to the pane.

12. The arrangement of claim 11 wherein:
the optically transparent connecting element includes a gel pack.

13. The arrangement of claim 11 further comprising:
fastening elements connecting the one side of the light-transmitting body to the pane.

14. The arrangement of claim 11 wherein:
the pane is sloped.

15. A camera arrangement comprising:
a camera aimed towards a pane of a vehicle and being separated from the pane such that a space is between the camera and the pane; and
a coupling element having a hollow body filled with an optically transparent solid casting mass, wherein the casting mass has a refractive index different than the refractive index of air, wherein one side of the casting element is conected to the pane and an opposite side of the coupling element is connected to the camera such that the coupling element connects the camera to the pane with the casting mass filling the space between the camera and the pane.

16. The arrangement of claim 15 wherein:
the casting mass has a refractive index substantially similar to the refractive index of the pane.

17. The arrangement of claim 15 wherein:
the pane is a sloped glass pane.

18. The arrangement of claim 15 wherein:
the casting mass includes at least one of a soft elastomer, glass, and gel.

19. The arrangement of claim 15 further comprising:
a detachable mechanical connector connecting the coupling element to the pane.

20. The arrangement of claim 15 wherein:
the casting mass includes areas having optical effects that form image correction elements.

21. A camera arrangement comprising:
a camera aimed towards a pane of a vehicle and being separated from the pane such that a space is between the camera and the pane; and
a solid and optically transparent light-transmitting body, wherein the light-transmitting body has a refractive index different than the refractive index of air; and a coupling element having a hollow body, wherein one side of the coupling element is connected to the pane and an opposite side of the coupling element is connected to the camera such that the coupling element connects the camera to the pane;

wherein the light-transmitting body is arranged within the hollow body of the coupling element such that the light-transmitting body fills the space between the camera and the pane.

22. The arrangement of claim 21 wherein:

the light-transmitting body has a refractive index substantially similar to the refractive index of the pane.

23. A camera arrangement comprising:

a camera aimed towards a pane of a vehicle and being separated from the pane such that a space is between tha camera and the pane; and a light-transmitting body having first and second solid and optically transparent portions which have different refractive indexes, wherein one side of the first solid and optically transparent portion meets with and connects to the pane, one side of the second solid and optically transparent meets with and connects to the camera, and opposite sides of the first and second solid and optically transparent portions meet one another such that the light-transmitting body fills the space between the camera and the pane and connects the camera to the pane.

24. The arrangement of claim 23 wherein:

the refractive index of the first solid and optically transparent portion is substantially similar to the refractive index of the pane.

25. The arrangement of claim 24 wherein:

the different refractive indexes of the first and second solid and optically transparent portions act together to form an achromatic prism combination.

* * * * *

UNITED STATES PATENT AND TRADEMARK OFFICE
CERTIFICATE OF CORRECTION

PATENT NO. : 7,322,755 B2  Page 1 of 1
APPLICATION NO. : 11/542727
DATED : January 29, 2008
INVENTOR(S) : Carsten Neumann et al.

It is certified that error appears in the above-identified patent and that said Letters Patent is hereby corrected as shown below:

Column 8, Line 41, Claim 15:

Delete "casting" and insert -- coupling --.

Signed and Sealed this

Tenth Day of June, 2008

JON W. DUDAS
*Director of the United States Patent and Trademark Office*